United States Patent [19]

Janssen

[11] 4,450,901
[45] May 29, 1984

[54] HEAT RECOVERY ATTACHMENT FOR A HEATING APPARATUS

[75] Inventor: Norbert G. L. M. Janssen, Ulestraten, Netherlands

[73] Assignee: Stamicarbon B.V., Geleen, Netherlands

[21] Appl. No.: 340,048

[22] Filed: Jan. 18, 1982

[30] Foreign Application Priority Data

Jan. 16, 1981 [NL] Netherlands ............... 8100182

[51] Int. Cl.³ .................................. F24H 3/00
[52] U.S. Cl. ........................ 165/47; 165/122; 165/DIG. 2; 122/20 B
[58] Field of Search ........... 165/47, 122, DIG. 2; 126/364; 110/203; 122/20 B; 237/55

[56] References Cited

U.S. PATENT DOCUMENTS

| 1,500,838 | 7/1924 | Müller ..................... 237/55 |
| 2,077,599 | 4/1937 | Wales ..................... 237/55 |
| 2,276,400 | 3/1942 | Hubbard ................. 165/122 |
| 3,813,039 | 5/1974 | Wells ..................... 165/122 |
| 4,012,191 | 3/1977 | Lisankie et al. .......... 110/203 |
| 4,117,883 | 10/1978 | Feldmann ............. 165/DIG. 2 |
| 4,185,685 | 1/1980 | Giberson ............... 122/20 B |
| 4,331,199 | 5/1982 | Dehue ................... 165/122 |

FOREIGN PATENT DOCUMENTS 531458 1/1922 France .................. 165/122
790608 8/1979 Netherlands .
7907138 9/1979 Netherlands .

Primary Examiner—William R. Cline
Assistant Examiner—John M. Kramer

[57] ABSTRACT

Heat recovery attachment in combination with the combustion gas discharge duct of a gas-fired or oil-fired heating apparatus having a liquid or air circuit, substantially comprising a heat exchanger having a supply and a discharge connection for the combustion gases to be passed therethrough, and a fan which encourages combustion gases to flow through the heat exchanger. The heat exchanger extends at most partly into the combustion gas discharge duct, and means are present to direct the exit gases, after heat exchange, obliquely upwards into the combustion gas discharge duct in such a manner that they form a gas barrier extending substantially across the transverse section of the combustion gas discharge duct. Means are provided by which, if the fan is operating, substantially all combustion gases are forced to flow through the heat exchanger, and if the fan is not operating, or is inadequately operating, the combustion gases from the heating apparatus are directed at least in part through to the combustion gas discharge duct thereby totally bypassing the heat exchanger.

17 Claims, 3 Drawing Figures

HEAT RECOVERY ATTACHMENT FOR A HEATING APPARATUS

BACKGROUND AND SUMMARY OF THE INVENTION

This invention relates to a novel complementary device that can be incorporated in a combustion gas discharge duct of a gas-fired or oil-fired heating apparatus utilizing a liquid or air circuit as the heat exchanging medium. The present invention comprises in combination a heat exchanger having supply and discharge connections for the passage of combustion gases from a combustion gas discharge duct, a fan to force a substantial portion of the combustion gas to flow through the heat exchanger between the supply and discharge connections, and baffle means disposed at the discharge connection for providing a barrier to substantially prevent the discharge gases from totally bypassing the heat exchanger thereby permitting the increased extraction of heat energy therefrom.

As used herein, the term "complementary device" is used to describe a device that can be utilized in combination with a heating apparatus having a liquid or an air circuit so that more energy can be extracted from the combustion gases to the liquid or the air circuit being heated. This type of an economizer can be provided separately in the combustion gas discharge line, or it can also be integrated with the heating apparatus.

A prior type of complementary device is described in U.S. Pat. No. 4,331,199, wherein the supply and discharge connections for the combustion gases to and from the heat exchanger, respectively, are provided in the combustion gas discharge duct in such a manner that the passage in the combustion gas discharge duct is locally blocked thereby forcing the entire flow of combustion gases to pass through the heat exchanger. When the fan is functioning properly, there is no problem with such a prior device since the combustion gas flow is forced to pass through the heat exchanger and is subsequently directed back into the combustion gas discharge duct at a point downstream thereof. However, if the fan is inoperative, or is only inadequately operating, the fuel supply to the heating apparatus must be interrupted since there is little, if any, flow of combustion gases through the combustion gas discharge duct. If the fuel supply in such a case is not interrupted, carbon monoxide in the combustion gases may enter the room where the apparatus is installed. It is, of course, highly undesirable that such a result would occur as occupants of the room would be subjected to a dangerous atmosphere.

It is, therefore, of great importance to prior devices that the fan function trouble-free. Thus, in order to prevent the dangerous effects of a defectively operating fan, prior devices require extensive safety precautions, as described, for example, in the non-prepublished Dutch patent application No. 7907138.

An object of the present invention, therefore, is to eliminate the above-mentioned disadvantages and to provide a complementary device for a heating apparatus in which the combustion gases can be discharged through the combustion gas discharge duct when the fan does not function, or functions inadequately, without requiring the necessity of additional safety precautions. The device according to the present invention can be used in conjunction with a heating apparatus with or without a draft interruptor/downdraft deflector.

In accordance with the present invention, means are thus provided in which, if the fan is operating, substantially all of the flow of combustion gases are forced to pass through the heat exchanger to be subsequently directed to the combustion gas discharge duct downstream thereof, yet by which, if the fan is not operating or operating inadequately, the combustion gases are directed, at least in part, directly through the combustion gas discharge duct thereby substantially bypassing the heat exchanger.

According to one of the embodiments of the complementary device of the present invention, the heat exchanger only partially extends into the combustion gas discharge duct, and means are provided by which the combustion gases, after passing through the heat exchanger, can be directed into the combustion gas discharge duct at an upward angle so that they form a gas barrier, extending substantially across the transverse section of the combustion gas discharge duct. This gas barrier thus forms a type of closed aerodynamic valve when the fan is properly operating which diverts substantially all combustion gases upstream thereof through the heat exchanger.

The portion of combustion gases which exit the heat exchanger (hereinafter "exit gases") into the combustion gas discharge duct are thus directed at an angle so that these exit gases are led obliquely upwards into the discharge duct in the general direction of flow of the combustion gases normally through the discharge duct. Thus, a sealing combustion gas barrier is established at the place where the exit gases enter the combustion gas discharge duct when the fan is properly operating. It is thus achieved that the portion of combustion gases that is not in the first instance diverted into the opening of the heat exchanger is prevented from completely bypassing the heat exchanger by virtue of the exit gas barrier, so that such portion will eventually be subsequently forced to flow through the heat exchanger thereby saving its associated heat energy.

When the fan is not operating, or is inadequately operating, the combustion gases can completely bypass the heat exchanger through the combustion gas discharge duct by virtue of the unrestricted space provided between the heat exchanger and the interior surfaces of the discharge duct. Admittedly, no preheating of the water or the air is obtained in such an undesired mode of operation, but on the other hand, there is the substantial advantage that no combustion gases will flow into the room where the heating apparatus is installed, or, alternatively, that the boiler is rendered inoperative due to such existing conditions.

The angle of exit gas discharged relative to the central axis of the combustion gas discharge duct and the general flow of combustion gases therethrough is between about 40° and about 70°, preferably between 50° and 60°. Preferably, such angular discharge is provided by an inclined guide baffle positioned near the outlet opening. This guide baffle may extend partly into the combustion gas discharge duct a distance, as measured perpendicular to the central axis of the duct, for example, of about 0.25–0.50 times the inner diameter of the combustion discharge duct. By using a guide baffle of such dimensions, that portion of the exit gases is directed in a direction generally perpendicular to the central axis of the combustion gas discharge duct and are thus in part forced to the wall of the discharge duct opposite the outlet opening so that an effective flowing gas barrier is formed on the opposite side as well. To obtain this effect, the dimension of the guide baffle as measured in a direction generally parallel to the central axis of the combustion gas discharge duct is less than the corresponding dimension of the outlet opening.

In another embodiment of the complementary device according to the invention, the exit gases from the heat exchanger are directed into a closed chamber substantially surrounding the combustion gas discharge duct thereby forming a type of annulus structure. The wall of the combustion gas discharge duct is locally provided with apertures along substantially the entire circumference and optionally, along the height of the chamber, so that the combustion gases are directed obliquely upwards into the combustion gas discharge duct. The oblique inflow of the combustion gases through the apertures in the combustion gas discharge duct may be accomplished by utilizing strips placed obliquely at the positions of the apertures. These strips may be relatively simply provided by making incisions locally at the apertures along three sides and pressing the strips thus formed inward at an angle.

In order to have a normal discharge of the combustion gases via the combustion gas discharge duct when the fan is not operating, or operating inadequately, the heat exchanger is not positioned in the discharge duct more than at most a distance equal to half the inner diameter of the discharge duct.

BRIEF DESCRIPTION OF THE ACCOMPANYING DRAWINGS

A preferred embodiment of the device according to the invention will be described with reference to the accompanying drawings relating to a heating apparatus having liquid circuit wherein.

DETAILED DESCRIPTION OF THE PREFERRED EXEMPLARY EMBODIMENT

Figure 1:
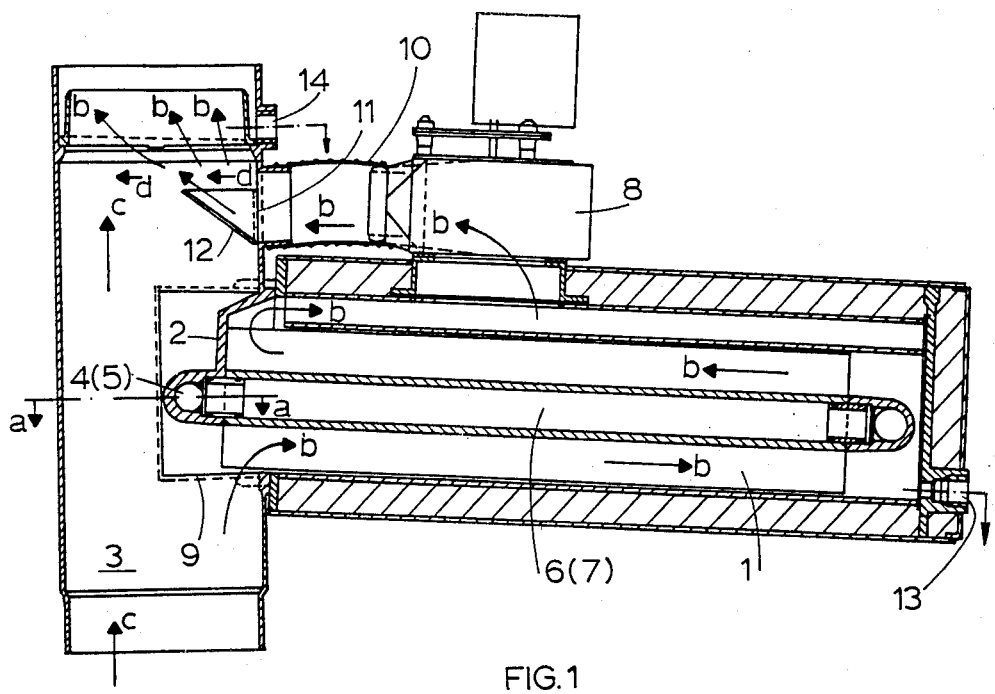
FIG. 1 is an elevational cross-sectional view of the heating apparatus mounted to a portion of discharge duct.
Figure 2:
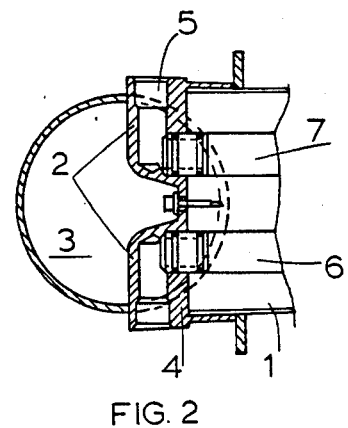
FIG. 2 is a plan view in section taken along the line a—a in FIG. 1.

The heat exchanger 1 as shown in FIG. 1 is basically conventional in design as described in the non-prepublished Dutch patent application No. 7906088. Referring to FIGS. 1 and 2, the heat exchanger 1 having side 2 is mounted to the combustion gas discharge duct 3 at a predetermined position. The supply and discharge for the circulating liquid in the heat exchanger circuit are indicated by 4 and 5, respectively. The conduits in the heat exchanger 1 through which the liquid flows from supply 4 to discharge 5 are indicated by 6 and 7, respectively. Side 2 of the heat exchanger 1 does not extend, or extends only partially, into discharge duct 3 so that a relatively large local area of duct 3 remains unobstructed.

Combustion gases are drawn from the combustion gas discharge duct into the heat exchanger 1 via inlet opening 9 by virtue of fan 8. These gases then flow through the heat exchanger 1 to the fan 8, as indicated by arrows b thereby permitting transfer of heat energy from the combustion gas to the liquid flowing in conduits 6 and 7. The gases are then directed into the combustion gas discharge duct 3 through connection 10 having passage 11 and guide baffle 12 extended into duct 3. These combustion gases which are directed back into the discharge duct will necessarily be at a lower temperature than those gases which initially enter the heat exchanger 1 through inlet opening 9. The combustion gases which reenter the discharge duct after the heat exchanging process will hereinafter be referred to as exit gases while that portion of combustion gases which initially enter the heat exchanger 1 will be referred to as inlet gases.

The performance curve of fan 8 should be as steep as possible and sized to accept the capacity (e.g. maximum pressure gas displacement volume) of the heating apparatus. A steep performance curve is desirable to avoid the heating apparatus operating dependently to an impermissible extent on incidental circumstances, such as downdrafts or obstructions in the combustion gas discharge duct, for example, obstructions due to fouling.

As shown in FIG. 1, guide baffle 12 is disposed at an angle so that the exit gases are obliquely directed upwards into the combustion gas discharge duct 3 relative to the general direction of flow of discharge gases through the duct 3 (noted generally by arrow c). Due to the inclined position of guide baffle 12, exit gases are angularly directed into the combustion gas discharge duct 3, strike the opposite wall of the duct, and are subsequently deflected in the direction of discharge gas flow (arrow c) through duct 3. A portion of the exit gases is directed into the combustion gas discharge duct 3 at an angle of about 90° relative to the central axis of the duct as indicated generally by arrows d. In this way, a "gas barrier" is obtained in the combustion gas discharge duct 3 and extends across substantially the entire cross section of the duct. This gas barrier substantially prevents the combustion gases that do not flow through the heat exchanger from passing through flow the discharge duct thereby wasting that portion of heat energy associated therewith. Thus, by virtue of the present invention, virtually all the combustion gas is directed through the heat exchanger.

For example, it has been found that by adding a tracer gas to the combustion gases, only a small amount of combustion gases totally bypass the heat exchanger and are not blocked by the gas barrier heretofore described. The amount which does totally bypass the heat exchanger and barrier varies with the load of the heating apparatus. However, it has been found that when a heating apparatus having a design capacity of 30 kilowatts is operating at 67% of such design capacity, only about 2% of the combustion gas flow totally bypasses the heat exchanger and gas barrier. Thus, the gas barrier is effective in directing substantially all of the combustion gases through the heat exchanger.

In the event of fan failure, the combustion gases will be discharged to ambient by the combustion gas discharge duct 3 and the unobstructed space in discharge duct 3 locally at end 2 of heat exchanger 1 is sufficiently large to permit such flow. In the event of inadequate fan operation, the combustion gases will be partially directed through heat exchanger 1 according to arrows b, and partially discharged to ambient through discharge duct 3 according to arrows c.

Figure 3:
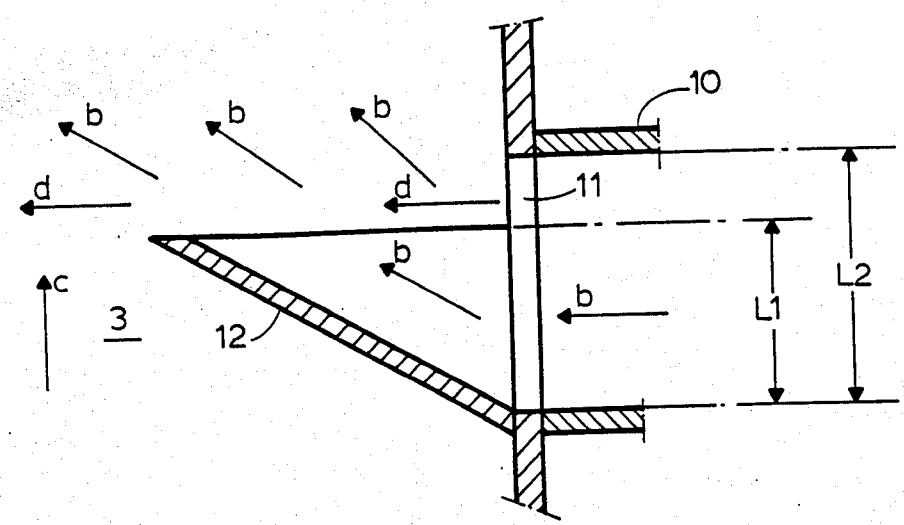
FIG. 3 is a partial cross-sectional view of a baffle according to the present invention.

Referring more specifically to FIG. 3, the angle that baffle 12 forms relative to the central axis of duct 3 is between about 40° and about 70°, preferably between about 50° and about 60°. Baffle 12 extends partly into the combustion gas discharge duct. The horizontal projection of this baffle 12 is preferably equal to about 0.25 to about 0.50 times the inner diameter of the combustion gas discharge duct 3. Also, in order to effect generally perpendicular flow (arrows d) relative to the direction of flow of combustion gases in duct 3, the dimension L1 of baffle 12 as measured parallel to the central axis of duct 3 should be less than dimension L2 of outlet opening 11 as similarly measured. Preferably, dimension L2 should be in the range of about 1.1 to about 1.5 times greater than dimension L2, and more preferably in the range between about 1.20 to about 1.35 times greater than dimension L2. The area of opening 11 and the fan capacity are such that the exit gases from the heat exchanger 1 flow into the combustion gas discharge duct 3 with a velocity of between about 8 to 12 meters per second (m/s).

The condensate which may form in heat exchanger 1 is continuously drained via opening 13, and similarly, the condensate which may form in combustion gas discharge duct 3 is drained via opening 14. Both openings 13 and 14, may be interconnected to a joint discharge line via a water lock (not shown). In the above-described version, fan 8 is located after the heat exchanger when viewed in the direction of flow of the combustion gases. However, it is also possible to place fan 8 before the heat exchanger without impairing the beneficial effects of the present invention.

Thus, while the present invention has been herein described in what is presently conceived to be the preferred embodiment thereof, those in the art may appreciate after a complete reading of the above description that many modifications may be made thereto within the scope of the present invention, which scope shall be accorded the broadest interpretation of the appended claims so as to encompass all equivalent devices, structures and assemblies.

What is claimed is:

1. A heat recovery attachment for a heating apparatus adapted to being operatively associated with a combustion gas discharge duct through which combustion gases flow in a predetermined direction, said device comprising in combination:

heat exchanger means for transferring a portion of the heat energy associated with said combustion gases to a working fluid including inlet means defining an inlet passageway for allowing at least a portion of said combustion gases to enter said heat exchanger means, outlet means defining an outlet passageway for allowing said combustion gases to exit said heat exchanger means, and fan means for encouraging said combustion gases to flow between said inlet and outlet means;

means for mounting said heat exchanger means to said discharge duct so that said inlet and outlet passageway means are in fluid communication with the interior of said discharge duct and so that a space is defined between said heat exchanger means and the opposite wall of said discharge duct thereby permitting a predetermined portion of said combustion gases to bypass said heat exchanger means; and barrier means operatively associated with said outlet passageway means, said barrier means for establishing a barrier comprising flowing combustion gases which exit said heat exchanger means through said outlet passageway means and for preventing loss of heat energy in that portion of said combustion gases which may initially bypass said heat exchanger means thereby causing substantially all of said bypass combustion gases to eventually flow through said heat exchanger means, said barrier means including baffle means having one end fixed near said outlet passageway means and another end inclined relative to said one end in the direction of said gas flow through said discharge duct for directing a predetermined portion of said combustion gases which exit through said outlet passageway means at an angle relative to the general direction of combustion gas flow in said discharge duct.

2. An attachment as in claim 1 wherein said baffle means comprises means defining at least one surface for directing said predetermined portion of said combustion gases which exit through said outlet passageway means at an angle relative to the general direction of combustion gas flow in said discharge duct.

3. An attachment as in claim 2 wherein said space defined between said heat exchanger means and said opposite wall of said discharge duct is no greater than 0.50 times the interior dimension of said discharge duct as measured perpendicularly with respect to the longitudinal axis of said discharge duct.

4. An attachment as in claims 1, 2 or 3 wherein said angle is between 40° to 70°.

5. An attachment as in claims 1, 2, or 3 wherein said angle is between 50° to 60°.

6. An attachment as in claim 1 wherein said outlet passageway means has an outlet dimension generally parallel to the longitudinal axis of said discharge duct, and said deflector means has a projected dimension generally parallel to said axis, said projected dimension being less than said outlet dimension.

7. An attachment as in claim 6 wherein said outlet dimension is between 1.1 to 1.5 times the said projected dimension.

8. An attachment as in claim 6 wherein said outlet dimension is between 1.20 to 1.35 times the said projected dimension.

9. An attachment as in claim 6 wherein said outlet dimension is 1.25 times the said projected dimension.

10. An attachment as in claims 1, 2, 3, 6, 7 or 8 wherein said baffle means extends a distance generally perpendicular to the elongated axis of said discharge duct of between 0.25 to 0.50 times the interior cross sectional dimension of said duct.

11. An attachment as in claim 10 wherein said discharge duct is substantially circular.

12. A device for a heating apparatus adapted to being operatively associated with a portion of a substantially cylindrical combustion gas discharge duct through which combustion gases flow, said device comprising in combination:

heat exchanger means for transferring a portion of the heat energy of said combustion gases to a working fluid including an inlet opening and an outlet opening having an opening dimension generally parallel to the longitudinal axis of said discharge duct, said inlet and outlet openings in fluid communication with the interior of said discharge duct and the combustion gases flowing therethrough, and fan means for causing at least a portion of said discharge gases to flow through said heat exchanger means in a predetermined path between said inlet and outlet openings;

means for mounting said heat exchanger means to said discharge duct so that a portion of said heat exchanger extends into the interior of said discharge duct a distance not greater than 0.50 times the inside diameter of said discharge duct; and barrier means defining at least one surface of establishing a barrier comprising flowing combustion gases exiting said heat exchanger means through said outlet opening, said barrier means including means defining a surface extending into said discharge duct and having one end fixed near said outlet opening, said surface defining means being inclined generally in the direction of flow of said combustion gases through said discharge duct at an angle between 40° to 70° relative to said axis, said surface defining means having a first dimension as measured generally parallel to said axis, which first dimension is less than said second dimension, and a second dimension as measured generally perpendicular to said axis, which second dimension is between 0.25 to 0.50 times the diameter of said discharge duct.

13. A device as in claim 12 wherein said opening dimension is between 1.1 to 1.5 times the said first dimension.

14. A device as in claim 12 wherein said opening dimension is between 1.2 to 1.35 times the said first dimension.

15. A device as in claim 12 wherein said opening dimension is 1.25 times the said first dimension.

16. A device as in claims 12, 13, 14 or 15 wherein said angle is between 50° to 60°.

17. A heat recovery attachment for a heating apparatus adapted to being operatively associated with a combustion gas discharge duct through which combustion gases flow in a predetermined direction, said device comprising in combination:

heat exchanger means for transferring a portion of the heat energy associated with said combustion gases to a working fluid including inlet means defining an inlet passageway for allowing at least a portion of said combustion gases to enter said heat exchanger means, outlet means defining an outlet passageway for allowing said combustion gases to exit said heat exchanger means, and fan means for encouraging said combustion gases to flow between said inlet and outlet means;

means for mounting said heat exchanger means to said discharge duct so that said inlet and outlet passageway means are in fluid communication with the interior of said discharge duct and so that a space is defined between said heat exchanger means and the opposite wall of said discharge duct thereby permitting a predetermined portion of said combustion gases to bypass said heat exchanger means; and barrier means operatively associated with said outlet passageway means, said barrier means for establishing a barrier comprising flowing combustion gases which exit said heat exchanger means through said outlet passageway means and for preventing loss of heat energy in that portion of said combustion gases which may initially bypass said heat exchanger means thereby causing substantially all of said bypass combustion gases to eventually flow through said heat exchanger means and wherein said barrier means includes deflector means extending into said discharge duct, said deflector means defining at least one surface for directing a predetermined portion of said combustion gases which exit through said outlet passageway means at an angle relative to the general direction of combustion gas flow in said discharge duct.

* * * * *

UNITED STATES PATENT AND TRADEMARK OFFICE
CERTIFICATE OF CORRECTION

PATENT NO. : 4,450,901

DATED : May 29, 1984

INVENTOR(S) : NORBERT JANSSEN

It is certified that error appears in the above-identified patent and that said Letters Patent is hereby corrected as shown below:

On the title page,

The assignee of this invention is:
-- NEOM B.V.
Sittard, the Netherlands. --.

Signed and Sealed this

Fourth Day of December 1984

[SEAL]

Attest:

GERALD J. MOSSINGHOFF

Attesting Officer     Commissioner of Patents and Trademarks